US010659726B1

(12) United States Patent
Dresang et al.

(10) Patent No.: US 10,659,726 B1
(45) Date of Patent: May 19, 2020

(54) SYSTEM FOR INSPECTING PIPELINES UTILIZING A WIRELESS DEVICE

(71) Applicants: Richard D. Dresang, Hartford, WI (US); Stephen R. Frey, Waukesha, WI (US); Kevin J. Witt, Jackson, WI (US); Keith F. Jacobs, Milwaukee, WI (US); Richard D. Ohlendorf, Cudahy, WI (US); Jacob E. Kaad, Slinger, WI (US)

(72) Inventors: Richard D. Dresang, Hartford, WI (US); Stephen R. Frey, Waukesha, WI (US); Kevin J. Witt, Jackson, WI (US); Keith F. Jacobs, Milwaukee, WI (US); Richard D. Ohlendorf, Cudahy, WI (US); Jacob E. Kaad, Slinger, WI (US)

(73) Assignee: VEMSI/HTV, Inc., Jackson, WI (US)

( * ) Notice: Subject to any disclaimer, the term of this patent is extended or adjusted under 35 U.S.C. 154(b) by 0 days.

(21) Appl. No.: 16/402,643

(22) Filed: May 3, 2019

(51) Int. Cl.
| | | |
|---|---|---|
| *H04N 7/10* | (2006.01) | |
| *F16L 7/00* | (2006.01) | |
| *H04N 7/12* | (2006.01) | |
| *F16L 101/30* | (2006.01) | |

(52) U.S. Cl.
CPC .................. *H04N 7/10* (2013.01); *F16L 7/00* (2013.01); *H04N 7/12* (2013.01); *F16L 2101/30* (2013.01)

(58) Field of Classification Search
CPC ..... H04N 7/10; H04N 7/12; F16L 7/00; F16L 2101/30

USPC .......................................................... 348/84
See application file for complete search history.

(56) References Cited

U.S. PATENT DOCUMENTS

| | | | |
|---|---|---|---|
| 7,010,759 B2 | 3/2006 | Janu | |
| 9,222,809 B1 * | 12/2015 | Olsson | ................... B65H 75/00 |
| 2008/0014917 A1 | 1/2008 | Rhoads et al. | |
| 2014/0340505 A1 * | 11/2014 | Olsson | ............... G01N 21/8803 |
| | | | 348/84 |

FOREIGN PATENT DOCUMENTS

WO    WO 2018/112411    6/2018

* cited by examiner

*Primary Examiner* — Nguyen T Truong
(74) *Attorney, Agent, or Firm* — Donald J. Ersler

(57) ABSTRACT

A system for inspecting pipelines utilizing a wireless device preferably includes a push cable inspection system, a data display unit, an interface software program and a WiFi transmitter. The push cable inspection system includes a push cable, a distance encoder and a cable reel. A video camera is attached to an end of the push cable. The distance encoder measures the distance traveled by the push cable. The data display unit receives an output from the distance encoder and the video camera. The data display unit overlays a changing numeric distance on the video feed to create a numeric video feed. The numeric video feed is transmitted by the WiFi transmitter to the wireless device. The interface software program is installed on the wireless device. The interface software program receives the numeric video feed from the data display unit and stores the numeric video feed on the wireless device.

6 Claims, 2 Drawing Sheets

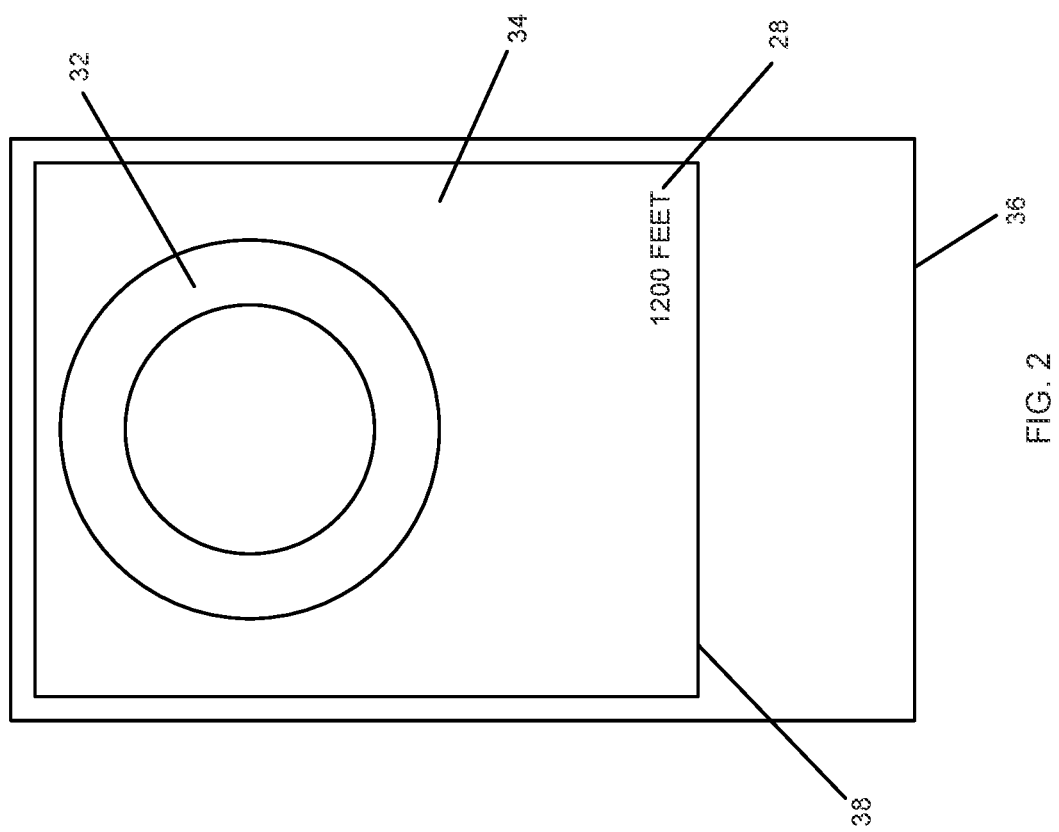

US 10,659,726 B1

SYSTEM FOR INSPECTING PIPELINES UTILIZING A WIRELESS DEVICE

BACKGROUND OF THE INVENTION

1. Field of the Invention

The present invention relates generally to inspecting pipelines and more specifically to a system for inspecting pipelines utilizing a wireless device, which displays an image of the pipeline and overlays the image with data.

2. Discussion of the Prior Art

A pipeline inspection system typically includes a cable reel and a recording device. The cable reel includes a push cable. A video camera is attached to an end of the push cable. The recording device records a video of the pipeline (or elongated enclosed space) as the video camera travels through the pipeline and displays the video on a display screen. U.S. Pat. No. 7,010,759 to Janu discloses a method for real time display of maintenance device location in an internal space. Patent publication no. 2008/0014917 to Rhoads et al. discloses wireless mobile phone methods. U.S. Pat. No. 9,222,809 to Olsson et al. discloses portable pipe inspection systems and apparatus. Patent publication no. WO 2018/112411 to Turner et al discloses a pipeline inspection device.

Accordingly, there is a clearly felt need in the art for a system for inspecting pipelines utilizing a wireless device, which displays an image of the pipeline; overlays the image with distance data; and eliminates the need for a recording device in a push cable inspecting system.

SUMMARY OF THE INVENTION

The present invention provides a system for inspecting pipelines utilizing a wireless device, which eliminates the need for a recording device. The system for inspecting pipelines utilizing a wireless device preferably includes a push cable inspection system, a data display unit, an interface software program, a DC battery and a WiFi transmitter. The push cable inspection system includes a push cable, a distance encoder and a cable reel. A video camera is attached to an end of the push cable. The push cable includes a plurality of wires. The plurality of wires provide electrical power to the video camera and a signal path for a video output of the video camera. The data display unit is preferably a microcontroller, but other electronic devices could be used. The data display unit receives outputs from the distance encoder and the video camera. The data display unit overlays a changing numeric distance on the video feed from the video camera to create a numeric video feed. The numeric video feed is transmitted by the WiFi transmitter to the wireless device. The DC battery supplies electrical power to the distance encoder, the video camera and the data display unit. The distance encoder measures the distance traveled by the push cable and thus by the video camera. The interface software program is installed on the wireless device. The interface software program receives the numeric video feed from the data display unit and provides the storage of the numeric video feed on the wireless device. The interface software program allows the numeric video feed to be stored as a photo or a video feed. A folder is created for storage of the photos and videos for a specific party. The photos and videos are also accessible for viewing. The photos and videos may also be sent to another party using email or text.

Accordingly, it is an object of the present invention to provide a system for inspecting pipelines utilizing a wireless device, which displays an image of the pipeline.

It is a further object of the present invention to provide a system for inspecting pipelines utilizing a wireless device, which overlays the image with distance data.

Finally, it is an object of the present invention to provide a system for inspecting pipelines utilizing a wireless device, which eliminates the need for a recording device in a push cable inspection system.

These and additional objects, advantages, features and benefits of the present invention will become apparent from the following specification.

BRIEF DESCRIPTION OF THE DRAWINGS

FIG. 2 is a video display of a pipeline generated by a system for inspecting pipelines utilizing a wireless device in accordance with the present invention.

DETAILED DESCRIPTION OF THE PREFERRED EMBODIMENTS

Figure 1:
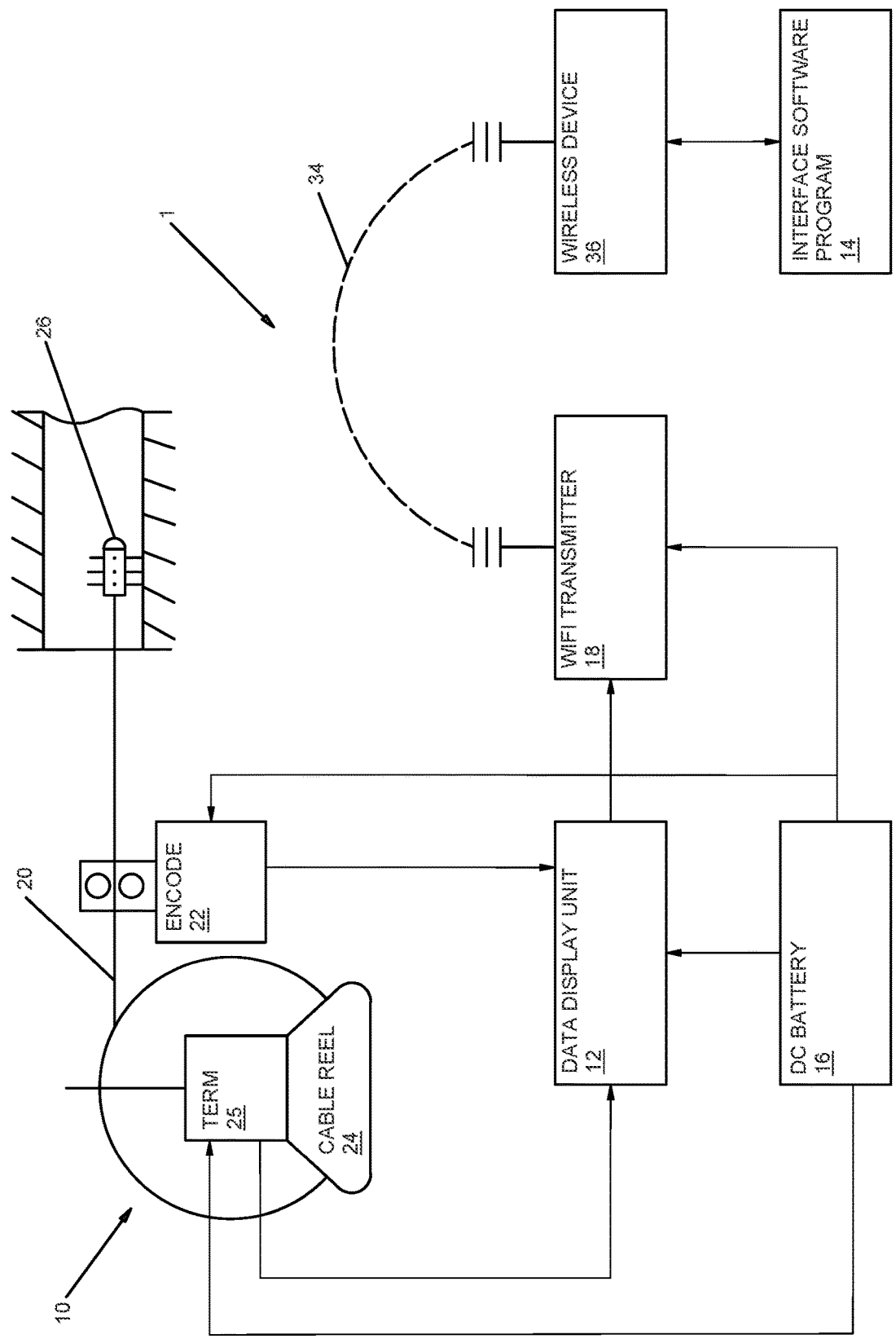
FIG. 1 is a schematic diagram of a system for inspecting pipelines utilizing a wireless device in accordance with the present invention.

With reference now to the drawings, and particularly to FIG. 1, there is shown a schematic diagram of a system for inspecting pipelines utilizing a wireless device 1. The system for inspecting pipelines utilizing a wireless device 1 preferably includes a push cable inspection system 10, a data display unit 12, an interface software program 14, a DC battery 16 and a WiFi transmitter 18. The push cable inspection system 10 includes a push cable 20, a distance encoder 22 and cable reel 24. A video camera 26 is attached to an end of the push cable 20. The push cable 20 includes a plurality of wires. The plurality of wires provide electrical power to the video camera 26 and a signal path for a video output of the video camera 26. The plurality of wires of the push cable 20 are accessible in a terminal 25. The data display unit 12 is preferably a microcontroller, but other electronic devices could also be used. The distance encoder 22 measures the distance traveled by the push cable 20 and thus by the video camera 26. The data display unit 12 receives an output from the distance encoder 22 and the video camera 26. With reference to FIG. 2, the data display unit 12 overlays a changing numeric distance 28 on the video feed of a pipeline 32 from the video camera 26 to create a numeric video feed 34. The numeric video feed 34 is transmitted by the WiFi transmitter to a wireless device 36. The DC battery 16 supplies electrical power to the distance encoder 22, the video camera 26, the WiFi transmitter 18 and the data display unit 12. The interface software program 14 is installed on a wireless device 36. The interface software program 14 receives the numeric video feed 34 from the data display unit 12 through the wireless device 36 and provides the storage of the numeric video feed 34 on the wireless device 36. The numeric video feed 34 is displayed on a display panel 38 of the wireless device 36. The interface software program 14 allows the numeric video feed 34 to be stored as a photo or a video feed. A folder is created for storage of the photos and videos for a specific party. The photos and videos are also accessible for viewing. The photos and videos may also be sent to another party using email or text.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A system for inspecting pipelines with a push cable inspection system utilizing a user supplied wireless device, the push cable inspection system includes a push cable, a video camera and a distance encoder, consisting of:
   a data display unit receives a video signal from the video camera and a distance signal from the distance encoder, said data display unit overlays said distance signal on to said video signal to create a numeric video feed, said data display unit does not include a display screen for user interaction or control;
   a WiFi transmitter receives said numeric video feed from said data display unit, said WiFi transmitter transmits said numeric video feed to the user supplied wireless device; and
   an interface software program is installed on the user supplied wireless device, the user supplied wireless device does not provide control of said data display unit, said interface software program enables the numeric video feed to be stored and accessed for transferring, said numeric video feed goes directly to the user supplied wireless device without going through a control device.

2. The system for inspecting pipelines of claim 1, further comprising:
   a battery for supplying electrical power to said data display unit, said WiFi transmitter, the distance encoder and the video camera.

3. The system for inspecting pipelines of claim 1 wherein:
   said interface software program enables storage of said numeric video feed into a file and creating a folder for storage of said file.

4. A system for inspecting pipelines with a push cable inspection system utilizing a user supplied wireless device, the push cable inspection system includes a push cable, a video camera and a distance encoder, the video camera disposed on an end of the push cable, the distance encoder measures the travel of the push cable inside an elongated enclosed space, consisting of:
   a data display unit receives a video signal from the video camera and a distance signal from the distance encoder, said data display unit overlays said distance signal on to said video signal to create a numeric video feed, said data display unit does not include a display screen for user interaction or control;
   a WiFi transmitter receives said numeric video feed from said data display unit, said WiFi transmitter transmits said numeric video feed to the user supplied wireless device; and
   an interface software program is installed on the user supplied wireless device, the user supplied wireless device does not provide control of said data display unit, said interface software program enables the numeric video feed to be stored and accessed for viewing and transferring, said numeric video may be stored as a photo or a video, said numeric video feed goes directly to the user supplied wireless device without going through a control device.

5. The system for inspecting pipelines of claim 4, further comprising:
   a battery for supplying electrical power to said data display unit, said WiFi transmitter, the distance encoder and the video camera.

6. The system for inspecting pipelines of claim 4 wherein:
   said interface software program enables storage of said numeric video feed into a file and creating a folder for storage of said file.

* * * * *